(12) United States Patent
Allen et al.

(10) Patent No.: US 11,733,020 B2
(45) Date of Patent: Aug. 22, 2023

(54) FIRST OBJECT FOR ASSEMBLY WITH A SECOND OBJECT AND METHOD OF ASSEMBLY THEREOF

(71) Applicants: NANYANG TECHNOLOGICAL UNIVERSITY, Singapore (SG); HEWLETT-PACKARD DEVELOPMENT COMPANY, L.P., Spring, TX (US)

(72) Inventors: William J. Allen, Corvallis, OR (US); Quang Cuong Pham, Singapore (SG); Dinh Huy Nguyen, Singapore (SG); Sterling Chaffins, Corvallis, OR (US)

(73) Assignees: NANYANG TECHNOLOGICAL UNIVERSITY, Singapore (SG); HEWLETT-PACKARD DEVELOPMENT COMPANY, L.P.

( * ) Notice: Subject to any disclaimer, the term of this patent is extended or adjusted under 35 U.S.C. 154(b) by 224 days.

(21) Appl. No.: 17/086,933

(22) Filed: Nov. 2, 2020

(65) Prior Publication Data
US 2021/0135408 A1    May 6, 2021

Related U.S. Application Data

(60) Provisional application No. 62/929,367, filed on Nov. 1, 2019.

(51) Int. Cl.
*G01B 7/00*    (2006.01)
*H02J 50/20*    (2016.01)
*H02J 50/00*    (2016.01)

(52) U.S. Cl.
CPC ............ *G01B 7/003* (2013.01); *H02J 50/001* (2020.01); *H02J 50/20* (2016.02)

(58) Field of Classification Search
CPC .......... G01B 7/003; H02J 50/001; H02J 50/20
See application file for complete search history.

(56) References Cited

U.S. PATENT DOCUMENTS

| | | | | |
|---|---|---|---|---|
| 3,446,064 A | * | 5/1969 | Ronald | G01B 7/16 73/796 |
| 4,789,292 A | * | 12/1988 | Holcomb | B25J 17/0208 29/709 |
| 4,982,333 A | * | 1/1991 | Ackerman | B23P 19/12 700/95 |
| 2003/0072646 A1 | * | 4/2003 | Frey | B25J 15/0206 414/800 |
| 2015/0197062 A1 | * | 7/2015 | Shinar | B29C 64/393 700/98 |

* cited by examiner

*Primary Examiner* — Robert H Kim
*Assistant Examiner* — Christopher J Gassen

(57) ABSTRACT

A first object for assembly with a second object, the first object comprising: a body having a first mating portion; and a first electronic element fabricated on the body; wherein the first electronic element is provided to establish an electrical coupling with a second electronic element fabricated on one of: the body and the second object, wherein a second mating portion is provided on the second object, and wherein the electrical coupling is configured to provide a measurable output for positioning the first mating portion at a desired position relative to the second mating portion according to an analysis of the measurable output against a predetermined reference output.

18 Claims, 8 Drawing Sheets

FIRST OBJECT FOR ASSEMBLY WITH A SECOND OBJECT AND METHOD OF ASSEMBLY THEREOF

FIELD

This invention relates to a first object for assembly with a second object and method of assembly thereof.

BACKGROUND

Assembly of parts into higher level components can be challenging and expensive, especially when tight tolerance fitting is required. Precision assembly tools and specifically trained human capabilities are expensive and have limited scalability and productivity. Normal industrial robots with simple positional control may also not be able to fulfill such tasks as knowledge of assembly constraints and recommendations (existing at design time for parts) is often lost and unavailable when designing and controlling assembly processes.

For example, in a common assembly task of inserting a peg into a hole, robot arms may be used to manipulate the peg and the block with the hole. One of the known techniques involves using a robotic arm to hold the peg and, based on a pre-defined location that identifies an approximated position of the hole, moving the peg close and relative to the hole in a circular orbit. During this time, pressure is applied and the peg touches the surface of the body in which the hole is provided. Although force-torque sensors may be provided near the end of each robot arm to sense when the peg and the hole physically engage so that searching motion of the robot arms can be terminated and an insertion motion is initiated, such force-torque sensor are expensive. Furthermore, although the robots move with high precision (sub-millimeter), there are larger errors in the ability of a vision system to determine the precise locations of the peg and hole relative to the robot arm grippers. In addition, parts are also not always manufactured with perfect consistency. Thus, in practice, an automated assembly process still faces many uncertainties related to positions of the parts being assembled.

It is therefore desirable to facilitate assembly of parts so as to allow less expensive capabilities, whether human or machine, to perform high quality assembly operations, thereby reducing costs.

SUMMARY

The present disclosure involves use of electronic elements provided on parts to be assembled that are capable of guiding one or more subsequent assembly process steps. The electronic elements may be fabricated with an appropriately capable additive manufacturing process (e.g., HPO Jet Fusion) during creation of the parts.

According to a first aspect, there is provided a first object for assembly with a second object, the first object comprising: a body having a first mating portion; and a first electronic element fabricated on the body; wherein the first electronic element is provided to establish an electrical coupling with a second electronic element fabricated on one of: the body and the second object, wherein a second mating portion is provided on the second object, and wherein the electrical coupling is configured to provide a measurable output for positioning the first mating portion at a desired position relative to the second mating portion according to an analysis of the measurable output against a predetermined reference output.

The first electronic element is provided exposed on a surface of the body.

The first electronic element may be provided embedded under a surface of the body.

The electrical coupling may comprise one of: conductive coupling, capacitive coupling and inductive coupling.

The first electronic element may be provided adjacent the first mating portion and the second electronic element may be provided adjacent the second mating portion.

The analysis of the measurable output against a predetermined reference output may be indicative of relative positioning of the first mating portion with the second mating portion to guide alignment of the first mating portion with the second mating portion during assembly of the first object with the second object, and the measurable output may be equal to the predetermined reference output when the first mating portion is at the desired position relative to the second mating portion.

The first electronic element may be configured to electrically couple with conductive portions of an electronic circuit provided to complete the electrical coupling with the second electronic element.

The first electronic element may comprise conductive traces provided exposed on at least one surface of the object.

The first mating portion may comprise a hole and the second object may comprise a peg to be inserted into the hole.

The electronic element may comprise a capacitive element provided on the body around the hole and the second electronic element may comprise a conductive plate provided at an end of the peg that is to be inserted into the hole.

The first electronic element and the second electronic element may be provided on an electro-mechanical switch provided on the body for application of a force thereon.

The electro-mechanical switch may be configured to close to establish the electrical coupling between the first electronic element and the second electronic element only when at least a predetermined force is applied on the electro-mechanical switch.

The first object may comprise a peg and the second mating portion may comprise a hole.

According to a second aspect, there is provided a gripper for manipulating the first object of the first object, wherein the conductive portions of the electronic circuit may be provided on the gripper.

According to a third aspect, there is provided a method of assembly of a first object with a second object; the method comprising:
(a) obtaining a measurable output from an electrical coupling established between a first electronic element and a second electronic element, wherein the first electronic element is fabricated on a body of the first object and the body has a first mating portion, wherein the second electronic element is fabricated on one of: the body and the second object and the second object has a second mating portion; and
(b) analyzing the measurable output against a predetermined reference output while moving the first mating portion relative to the second mating portion to position the first mating portion at a desired position relative to the second mating portion.

The first electronic element may be additively manufactured adjacent the first mating portion and the second electronic element may be additively manufactured adjacent the second mating portion, wherein analyzing the measurable output against a predetermined reference output while moving the first mating portion relative to the second portion is to guide alignment of the first mating portion with the second mating portion to position the first mating portion at the desired position relative to the second mating portion during the assembling, and wherein the measurable output is equal to the predetermined reference output when the first mating portion is at the desired position relative to the second mating portion.

The first mating portion may comprise a hole and the second object may comprise a peg.

The first electronic element may comprise a capacitive element provided on the body around the hole and the second electronic element may comprise a conductive plate provided at an end of the peg that is to be inserted into the hole.

The method may further comprise gripping and manipulating the first object with a gripper having conductive portions of an electronic circuit provided thereon such that the conductive portions electrically couple with the first electronic element to complete the electrical coupling with the second electronic element.

The first electronic element and the second electronic element may be provided on an electro-mechanical switch provided on the body for application of a force thereon for connecting the first mating portion with the second mating portion, the method may further comprise applying the force at an increasing magnitude until a predetermined force is reached that closes the electro-mechanical switch to establish the electrical coupling and obtain the measurable output that automatically stops application of the force.

According to a fourth aspect, there is provided a computer readable medium carrying processor executable instructions which when executed on a processor cause the processor to carry out the method of the third aspect.

For all aspects, electrical coupling comprises one of: conductive coupling, capacitive coupling and inductive coupling.

BRIEF DESCRIPTION OF FIGURES

In order that the invention may be fully understood and readily put into practical effect, there shall now be described by way of non-limitative example only embodiments of the present invention, the description being with reference to the accompanying illustrative drawings.

DETAILED DESCRIPTION

Figure 1:
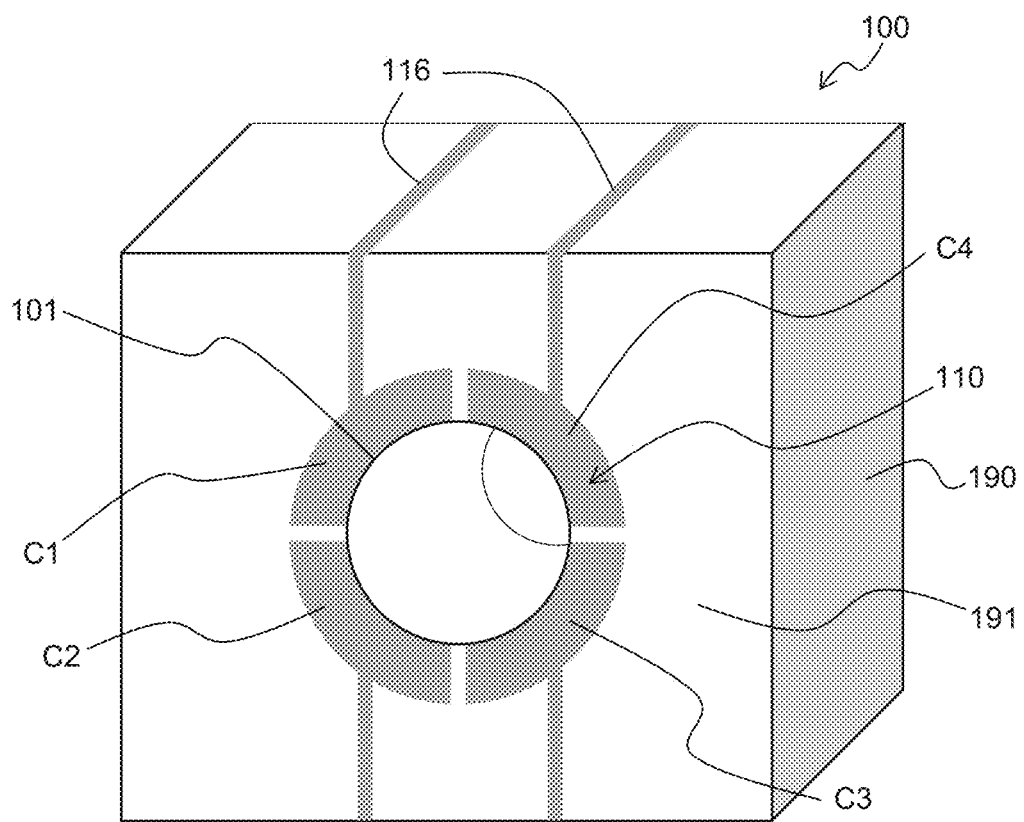
FIG. 1 is a schematic perspective view illustration of a first example of an embodiment of a first object and a second object to be assembled.
Figure 1:
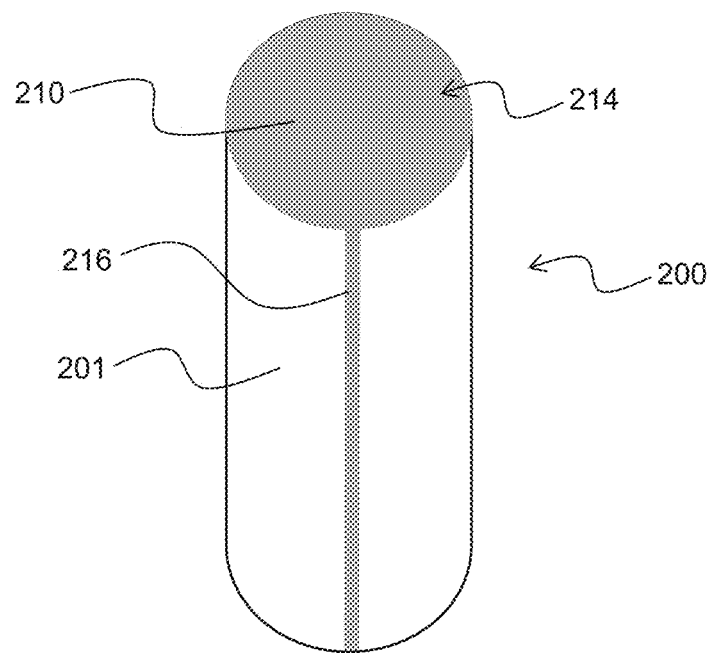

Examples of embodiments of a first object 100 for assembly with a second object 200 and a method 300 of assembly of the first object 100 with the second object 200 will be described below with reference to FIGS. 1 to 8. The same reference numerals are used across the figures to denote the same or similar parts. Throughout the specification, the term "object" is used synonymously and interchangeably with the term "part". The term "adjacent" is used to mean very near, next to, or touching depending on the context of the particular embodiment for which the term is used.

Figure 2:
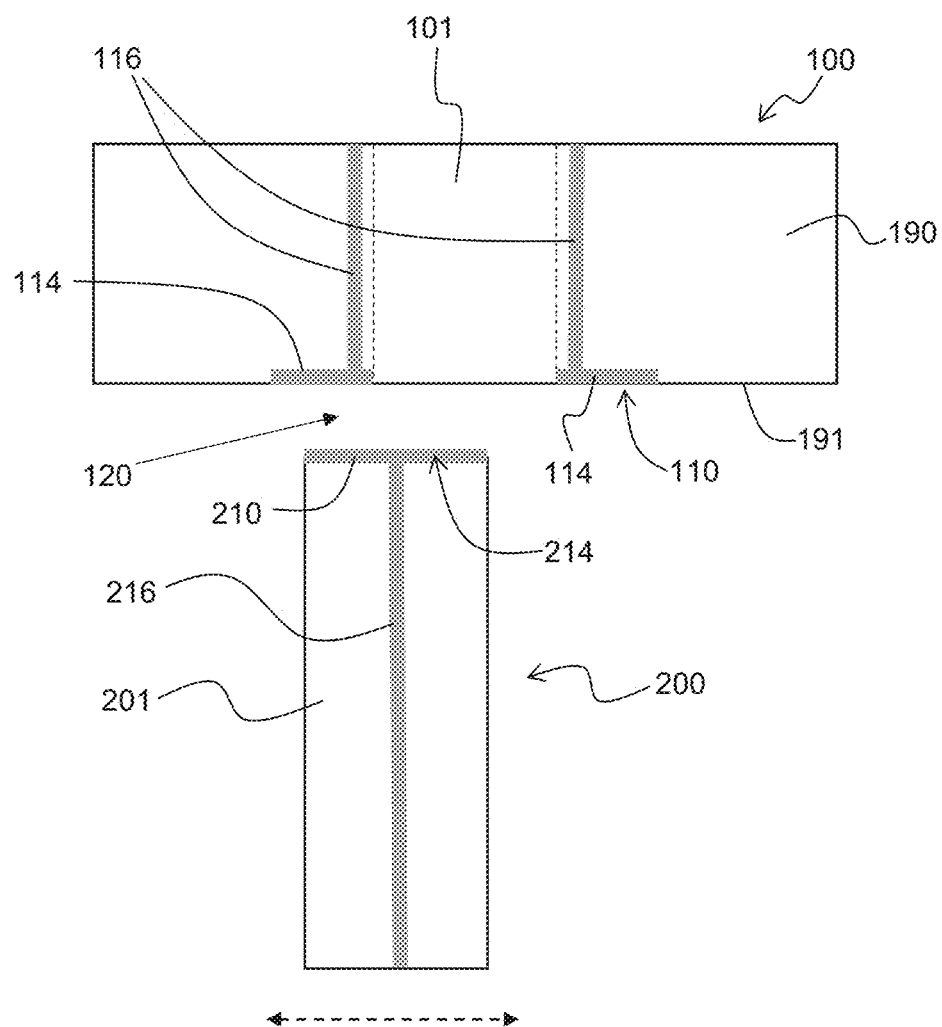
FIG. 2 is a schematic side view illustration of the first object and the second object of FIG. 1.

As shown in FIGS. 1 and 2, a common example of an assembly task comprising objects to be assembled is to insert a peg 200 into a hole 101. Thus, a body 190 in which the hole 101 is provided may be considered a first object 100 and the peg 200 may be considered a second object 200. The hole 101 can be considered a first mating portion 101 of the body 190 while the external surface or sides 201 of the peg 200 forms a second mating portion 201 provided on the peg 200 that is to be positioned relative to the first mating portion 101 or vice versa.

In this example, as can be seen in FIG. 1, a first electronic element 110 comprising a quadrant detector based on capacitive elements is provided on the body 190 around the hole 101, i.e., adjacent the first mating portion 101. The first electronic element 110 is preferably additively manufactured on the body 190. An example of an additive manufacturing apparatus that may be used to fabricate the first electronic element 110 is an HP® Jet Fusion 3D printer that can selectively deposit conductive ink into individual voxels, layer by layer, during the Jet Fusion build process. In this manner, arbitrary shapes of the first electronic element 110 can be fabricated from the conductive material in and/or on surfaces of the body 190. The body 190 may be fabricated from an insulating thermoplastic material and may even be printed in a same run as printing of the first electronic element 110 using the Jet Fusion 3D printer. Similarly, the second electronic element 210 may be additively manufactured on the second object 200. The first and second electronic elements 110, 210 may thus be integral with the first and second objects 100, 200 respectively.

The quadrant detector 110 may comprise four arcs C1, C2, C3, C4 of conductive material provided on the body 190 that define a broken circle around the hole 101, each arc C1, C2, C3, C4 defining a capacitive quadrant plates C1, C2, C3, C4 as shown in FIG. 1. However, depending on the positioning accuracy required, more than four capacitive plates may be provided around the hole 101 (not shown). In FIGS. 1 and 2, the detector 110 is shown integrated onto a surface 191 of the part 100 with the hole 101, i.e., the first electronic element 110 is provided exposed on the surface 191 of the body 190. In other embodiments (not shown), the capacitive plates 114 may be hidden below a thin layer of plastic of the body 190, so that the quadrant detector 110 is just under the surface 191 of the part 100 with the hole 101 and hence not visible exposed. In this way, the first electronic 110 may alternatively be provided embedded under the surface 191 of the body 190.

The second object 200 or peg 200 is provided with a conductive plate 210 that forms a second electronic element 210 for electrical coupling with the first electronic element 110. The second electronic element 210 is provided adjacent the second mating portion 201. In the example shown in FIGS. 1 and 2, the second electronic element 210 is provided as a conductive plate 210 added to an end 214 of the peg 200 that is to be inserted into the hole 101.

As can be seen in FIG. 1, the first and second objects 100, 200 may be further provided with conductive traces 116, 216 that are in conductive contact with the first and second electronic elements 110, 210 respectively. The conductive traces 116, 216 are configured to electrically couple the first and second electronic elements 110, 210 with an electronic circuit 400 (shown only in FIG. 3) that is provided to complete the electric coupling between the first and second electronic elements 110, 210. The electronic circuit 400 thus serves as a sensing circuit from which a measurable output can be obtained while the first and second electronic elements 110, 210 serve as sensing elements provided on the first and second objects 100, 200 respectively.

The conductive traces 116, 216 may be provided exposed on at least one surface of each object 100, 200 so that they can come into contact with conductive portions (not shown) of the electronic circuit 400. Thus, the conductive traces 116 may be provided to wrap around sides of the block or body 190 for contact with a gripper, and a far or insertion face 214 of the peg 200 is also conductive with the conductive traces 216 running up the sides 201 of the peg 200 for contact with another gripper.

In one embodiment, the conductive portions of the electronic circuit 400 may be provided on first and second grippers (not shown) at the ends of first and second robot arms (not shown) that pick up and manipulate the first and second objects 100, 200 to assemble them together. In use, the first gripper picks up the first object 100 with the hole 101 such that conductive portions of the electronic circuit provided on the first gripper come into contact with the conductive traces 116 provided on the first object and thereby make electrical contact with all four quadrant detector plates C1, C2, C3, C4 of the first electronic element 110. The second gripper picks up the peg 200 such that the conductive portions of the electronic circuit provided on the second gripper come into contact with the conductive traces 216 provided on the surface of the peg 200 and thereby make electrical contact with the conductive plate 210. In this way, an electrical connection is made between the first electronic element 110 and the electronic circuit, and an electrical connection is also made between the second electronic element 210 and the electronic circuit 400.

Appreciably, it is not necessary that a gripper used to manipulate the first or second object should complete the electrical connection between the first and second electronic elements 110, 210 and with the electronic circuit. In alternative embodiments, a separate non-gripping component 600 (FIG. 7) could be electrically connected or coupled with the object 100 such that the separate non-gripping component 600 makes the electrical connection/coupling between the first and second electronic elements 110, 220 and the electronic circuit 400. This removes the necessity of the gripper from also having the task of making the electrical connection between the electronic elements 110, 210 and the electronic circuit 400.

When the electronic circuit 400 is closed by the first and second grippers (not shown) gripping the first and second objects 100, 200 and applying an AC voltage V, positioning the second object 200 near the first object 100 forms an air capacitor 120 between the first electronic element 110 and the second electronic element 210 to give rise to a measurable output, as shown in FIG. 2. In this example, the measurable output is capacitance. At each relative position of the peg 200 with the hole 100, capacitance C of the air capacitor 120 can be measured between the conductive surface 210 on the peg 200 and each of the four quadrant detector plates 114 by connecting a capacitance meter to the electronic circuit 400.

Figure 3:
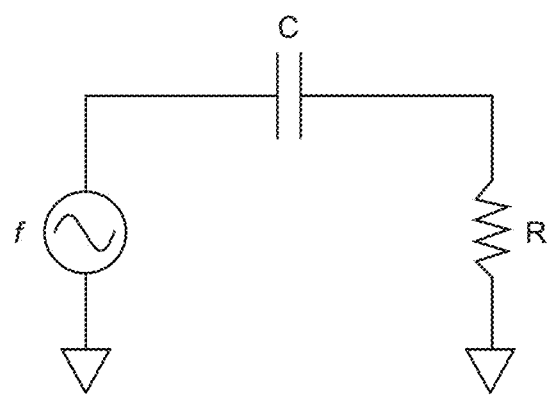
FIG. 3 is a schematic illustration of an electronic circuit.

In the arrangement of the electronic circuit 400 (known as a high pass filter) as shown in FIG. 3, the reactance of the capacitor 120 is very high at low frequencies so the capacitor 120 acts like an open circuit and blocks any input signals at $V_{in}$ until the cut-off frequency point ($f_c$) is reached. As capacitance increases and frequency of the AC voltage increases, AC voltage across a resistor R in the electronic circuit 400 goes up, according to equation 1 below:

$$\text{Voltage across } R = V_{out} = RC\frac{dV_{in}}{dt} \quad (1)$$

Above this cut-off frequency point the reactance of the capacitor 120 has reduced sufficiently as to now act more like a short circuit allowing all of the input signal to pass directly to the output ($V_{out}$), allowing the voltage to be measured, and hence also allowing the capacitance C to be measured.

The cut-off frequencies $f_c$ can be computed according to equation 2 below:

$$f_c = \frac{1}{2\pi RC} \quad (2)$$

Figure 4:
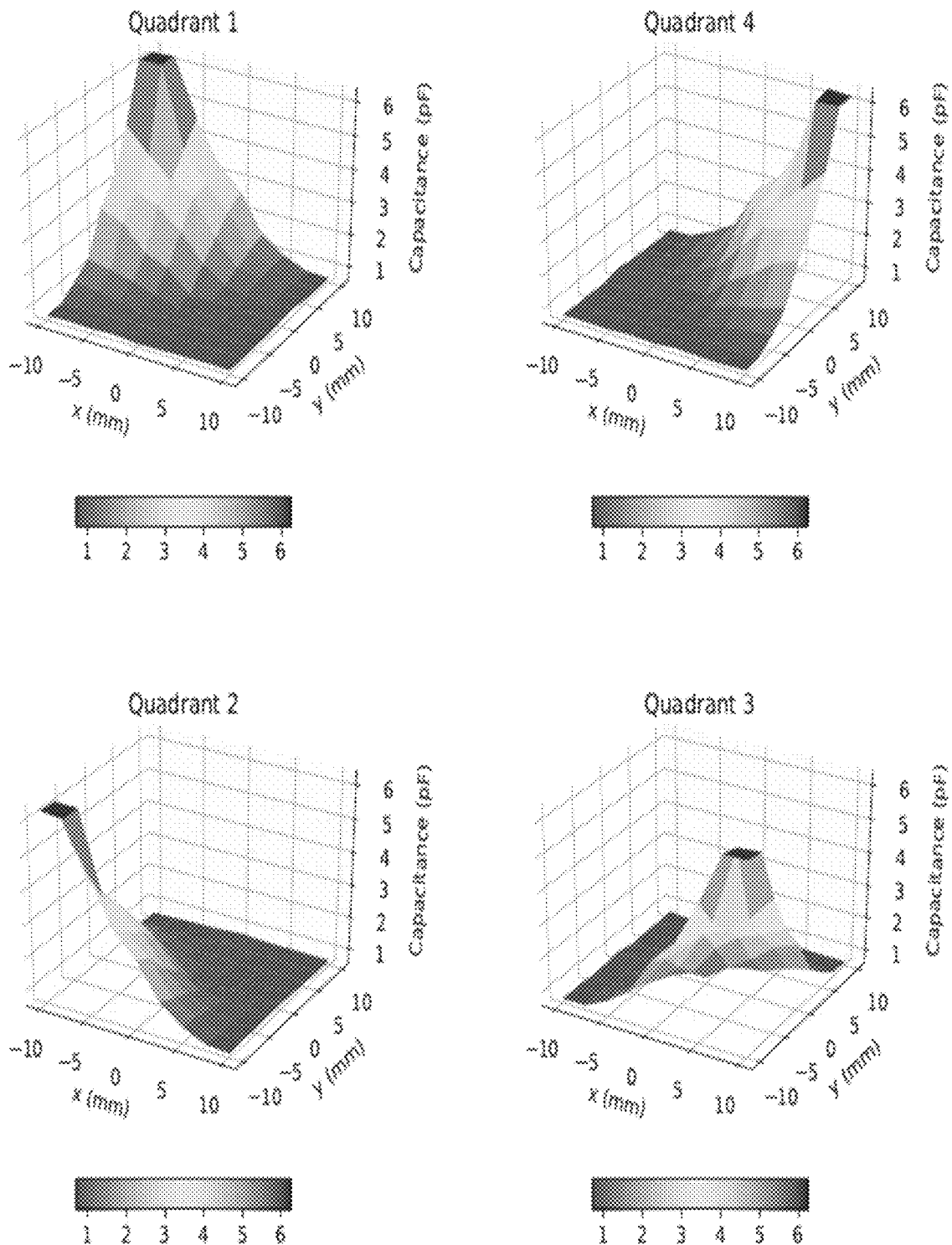
FIG. 4 are examples of maps of capacitance between the second object and each quadrant detector plate of the first object of FIG. 1.

By systematically repositioning the peg 200 relative to the hole 100, maps of capacitance between the peg 200 and each quadrant detector plate 114 as a function of relative position (x, y) can be obtained, as shown in FIG. 4.

The capacitance C values can be obtained as a clear signal with the peg 200 to quadrant detector plate 114 capacitance values significantly varying as a function of relative (x, y) position of the peg 200 relative to the quadrant detector plates 114. Because the quadrant detector 110 surrounds a hole 101, the peg 200 to hole 101 relative position is easily calculated from these measurements without requiring any contact with or between the first and second objects 100, 200.

Figure 8:
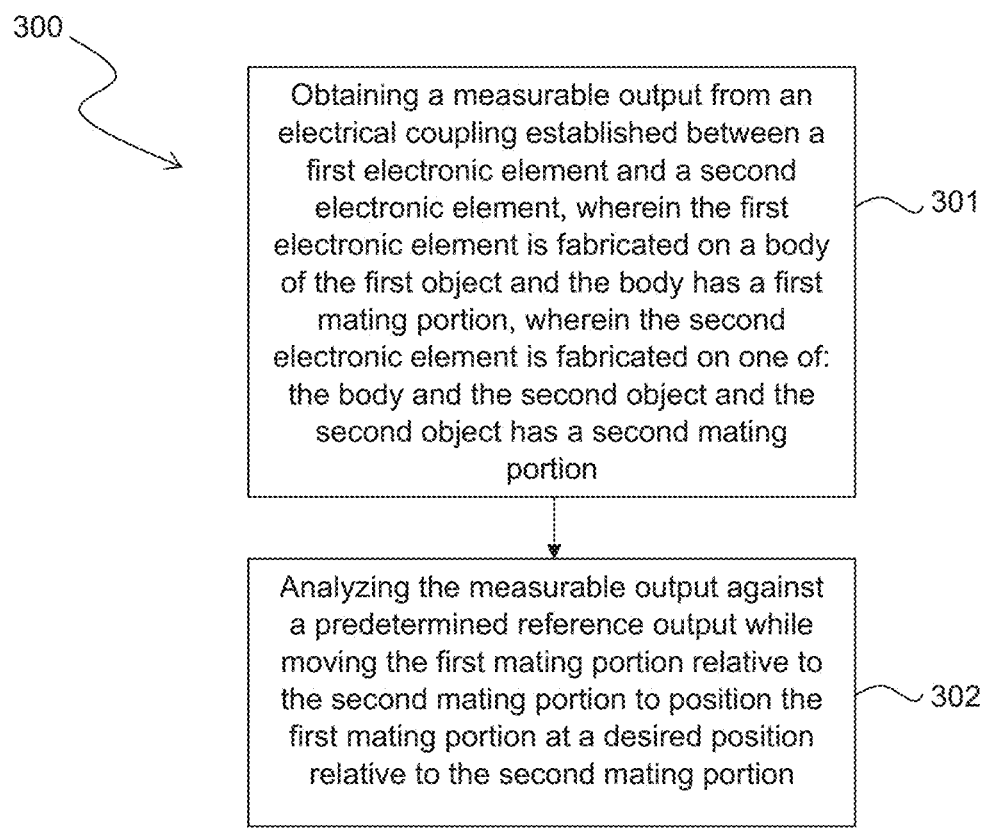
FIG. 8 is a flowchart of an example of a method of assembly of a first object with a second object.

In an example of a method 300 of assembly of the first object 100 with the second object 200 (as shown in the flowchart of FIG. 8), the measurable output (in this case the measured capacitance C) is obtained (301) and then analyzed (302) against a predetermined reference output (in this case a reference capacitance and/or its correlation values) while moving the first mating portion 101 relative to the second mating portion 201 to position the first mating portion 101 at a desired position relative to the second mating portion 201. Moving the first and/or second mating portions 101, 201 is controlled by appropriate corrective motion vectors that are generated for at least one of the first and second robots involved in holding and positioning the first and second objects 100, 200 respectively in the assembly process. The corrective motion vectors are generated from the analysis of the measured output against the reference output in order to reposition, if necessary, the peg 200 and/or the hole 101 until the peg 200 is at the desired position relative to the hole 101. When the first mating portion 101 is at the desired position relative to the second mating portion 201, the measurable output may be equal to the predetermined reference output, for example. The predetermined reference output is thus a previously recorded sensing condition obtained when the peg 200 is positioned at the desired position relative to the hole 101. Analysis of the measurable output against the predetermined reference output is therefore indicative of relative positioning of the first mating portion 101 with the second mating portion 201 to guide alignment of the first mating portion 101 with the second mating portion 201 during assembly of the first object 100 with the second object 200.

If desired, an additional measurement of position can be taken, and possibly a fine refinement of relative position can be made by another robot movement. For example, a Proportional-Integral-Derivative (PID) controller (not shown), a much-used feedback control design, can be used to command the robot to move the peg 200 to the desired position by continuously calculating an error value as the difference between a desired position and a measured (x, y) position of the peg 200 and applying a correction based on proportional, integral, and derivative terms. In summary, the (x, y) position of the peg 200 relative to the quadrant detector 114 can be used to design a feedback loop to control the robot to reposition the peg 200 until the peg 200 reaches the desired position.

Figure 5:
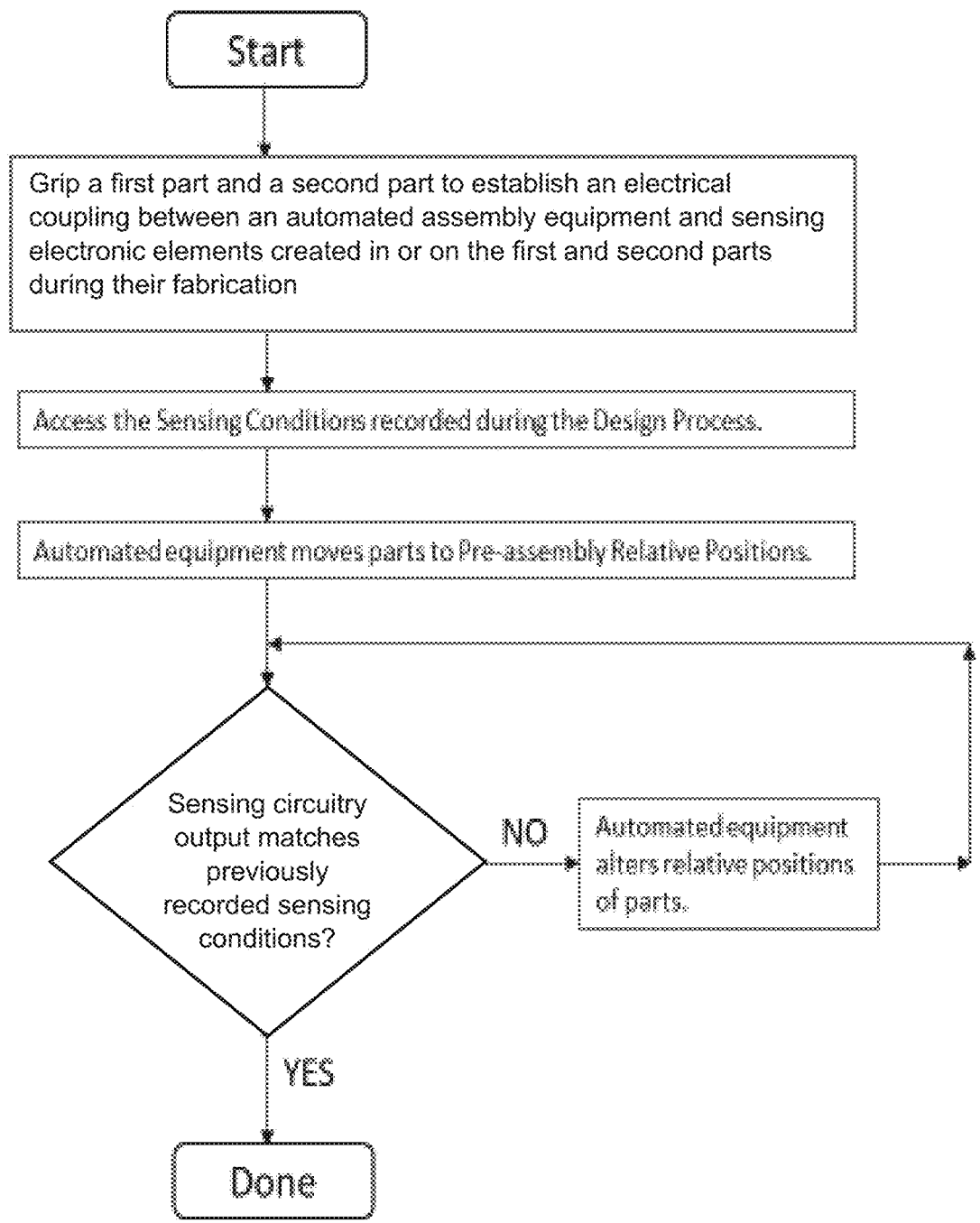
FIG. 5 is an example of an assembly process flowchart showing steps for assembling the first object with the second object.

Once the system determines that the relative position of the peg and hole are within tolerances, insertion motion instructions are then sent to command at least one of the first and second robots to insert the peg 200 into the hole 100. FIG. 5 shows an example of an assembly process flowchart that may be followed to assemble the first object 100 with the second object 200.

The example described with reference to FIGS. 1 to 4 above applies to peg-hole insertion alignment. Other possible variations of mating parts include slots, dovetails, notches etc. These are similar to hole and peg in that a pair of co-designed parts are mechanically mated during the assembly process by appropriately configuring and locating electronic elements adjacent the mating portions of the parts that are to be assembled together.

Many other assembly processes can be aided by adding electronic elements 110, 210 to the parts 100, 200 produced by additive manufacturing. For example, degree/completeness of assembly detection, where electronic elements can be added to control depth of insertion. For example, it may be the case that a peg should be inserted into a hole to a desired depth, and there may not be a mechanical stop (e.g. bottom of the hole) to allow a simple "insert until it stops going in" technique to properly position the peg in the hole. In such a case, conductive surfaces can be printed on the hole and the peg, and positioned to make contact with each other only when the peg is inserted to the desired depth in the hole. In one embodiment, a first electronic element comprising an annular (ring) conductor may be provided around the girth of the peg, and a second electronic element comprising a complimentary ring conductor may be provided inside the hole, perhaps near the opening of the hole. As the peg is inserted into the hole, when the desired depth is attained, the two conductive rings are positioned on the peg and the hole such that they come into contact with each other to close a circuit. This indicates that proper depth condition has been attained, and further insertion will cease. In other words, upon inserting the peg into the hole correctly, the first electronic element comprising a conductive surface provided on a side of the peg and the second electronic element provided inside the bore of the hole can come into contact when an appropriate insertion depth of the peg into the hole is achieved, generating a "depth achieved" signal.

As an alternative to contact, the annular conductors that form the first electronic element and the second electronic element on the peg and the hole respectively could be provided just below the surface of the outside of the peg and the inside of the hole. As they are brought into proximity, capacitance between them will rise measurably to allow detection of proper depth insertion when the measured capacitance reaches a predetermined reference capacitance that indicates proper depth insertion. Also, the ability to transmit a radio frequency (RF) signal from one electronic element to another electronic element to the other will increase. By measuring for a peak in capacitance, or transmission signal strength, the relative distance between the conductors can be minimized, thereby ensuring proper peg insertion.

Figure 6:
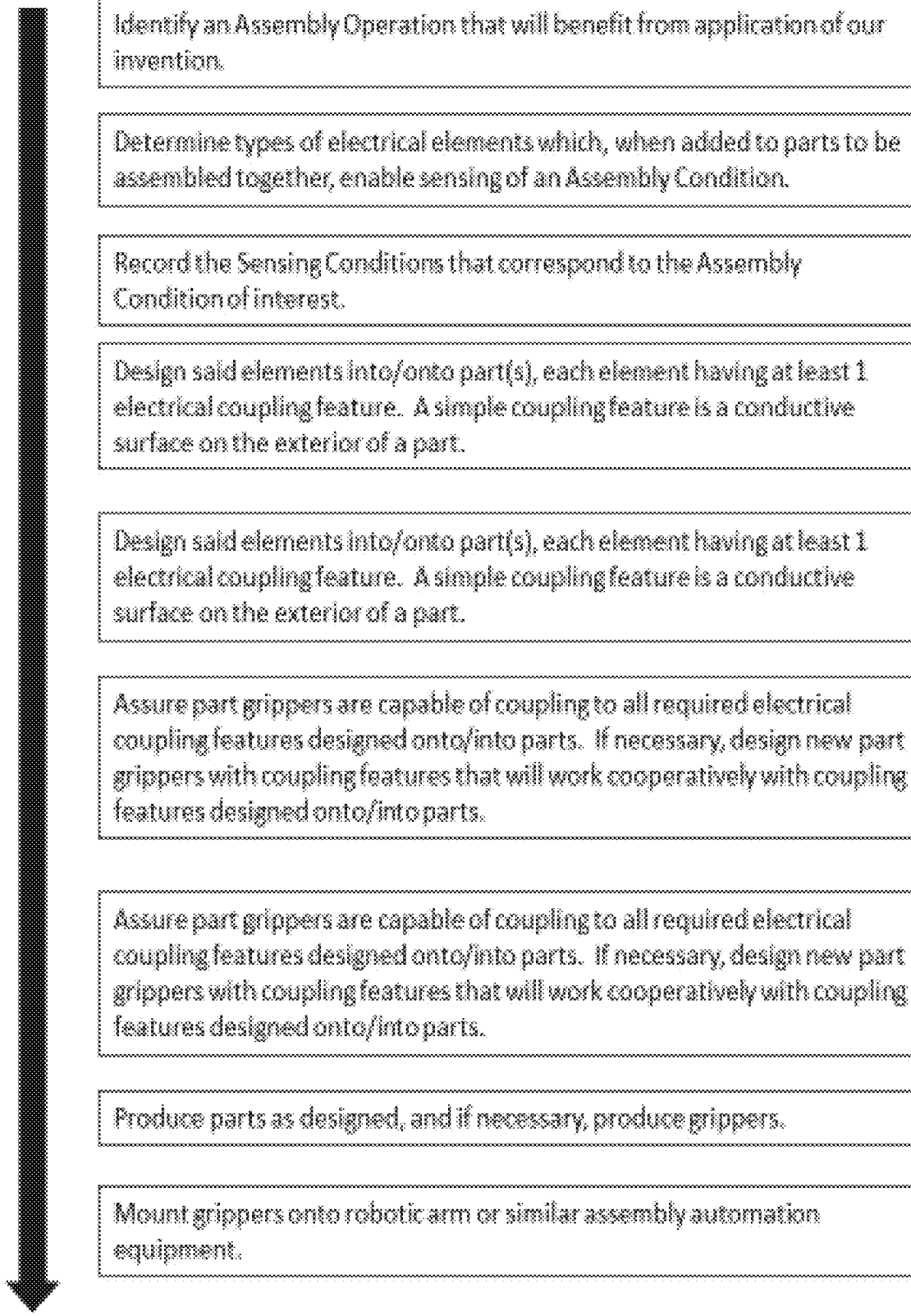
FIG. 6 is an example of a design process flowchart showing for designing objects to be assembled.
Figure 7:
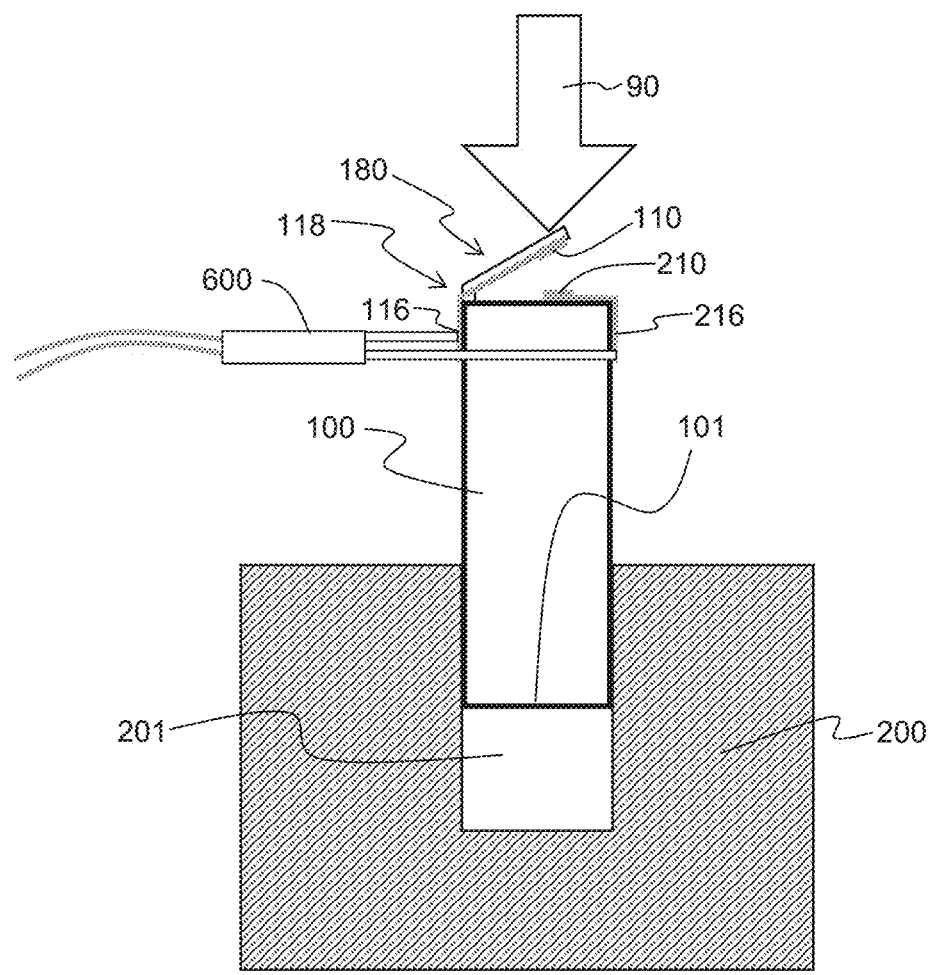
FIG. 7 is a schematic side view illustration of a second example of an embodiment of the first object and a second object to be assembled.

The above described first and second objects thus carry "programming" for assembly by way of where the conductors or electronic elements are placed on them. Different pegs or objects, perhaps made from different materials, can all be automatically assembled to appropriate (and different) depths using the present invention. This makes it impossible to accidently decouple assembly instructions from parts. Key assembly constraints and intent are captured when the part is designed to include appropriate placement of electronic elements, not as separate data but as part of the physical definition of the part. FIG. 6 shows an example of a design process flowchart that may be followed when designing the first object for assembly with the second object.

Another example (not shown) of the first electronic element provided on the first object may comprise an inserted pressure gauge connected to an RF power-harvesting circuit and a transmitter. Such an embedded sensor could transmit pressure (and or temperature and other measurable parameters) during a peg-hole (or other) assembly step and control that assembly step process.

Strain gauges are another type of electronic element that can be printed on an object with an HP® Jet Fusion printer and used to guide assembly. Strain gauges could be used to calibrate a required force needed for proper part assembly.

In a further example, as shown in FIG. 5, it may be necessary to insert a peg 100 into a hole 201 of a block until a force threshold is achieved. In this example, the peg 100 can be considered the first object 100 where the first mating portion 101 is an insertion end 101 of the peg 100 while the block is the second object 200 and the hole 201 is the second mating portion 201. An electro-mechanical switch 180 can be fabricated into the top 118 of the peg 100. This switch is normally open. During insertion, a robot (not shown) applies a force 90 to the top 118 of the peg 100, after aligning the peg 100 with the hole 201. The applied force will drive the peg 100 into the hole 201 to a certain depth, and it will also work to close the switch 180. By designing the switch 180 appropriately, it will close only when a predetermined threshold level of force is reached or exceeded. When the switch 180 closes, a circuit is closed, and the automated assembly process will stop as the desired insertion threshold will have been achieved. Thus, in this example, the first electronic element 110 and the second electronic element 210 are both provided on the body 190 of the peg 100 and spaced apart from each other when the switch 180 is open. The first electronic element 110 and the second electronic element 210 only become electrically coupled with each other when the switch is closed 180 when at least the predetermined force is applied on the switch 180. A non-gripping component 600 may be provided to form the electrical connection between the first and second electronic elements 110, 210 and the electronic circuit 400 (FIG. 3). In this example, the applied force can thus be considered a measurable output while the predetermined force can be considered a predetermined reference output against which the applied force is analyzed in order to position the peg 100 at the desired position relative to the hole 201.

The above technique for completeness of assembly detection is thus beneficial because parts "carry" the assembly instructions in/on themselves by virtue of their design. For example, one peg may require 23 N of insertion force, and the switch on the top of that peg will close when 23 N of force is applied. Another peg may need 30 N of insertion force, and it will have a 30 N closure force designed into the switch on top of it. Other electrical elements could also be employed.

In addition to the capacitive elements and switch embodiment of the first and second electronic elements, other sensors and electronic devices can also be used. The electronic elements can be incorporated into parts by way of a voxel-based additive manufacturing process. These co-fabricated electronic elements can then be used to guide one or more subsequent assembly operations of the parts.

Figure 9:
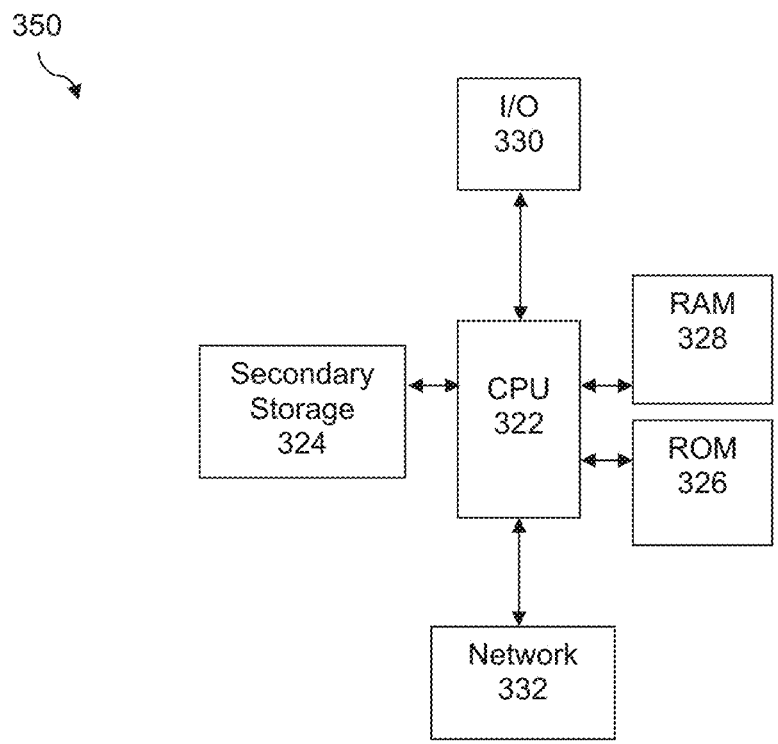
FIG. 9 is a block diagram showing a technical architecture of a computer suitable for implementing a method of assembly of a first object with a second object.

FIG. 9 is a block diagram showing an example of a technical architecture 350 of a system which is suitable for implementing the method 300 of assembly of the first object 100 with the second object 200 described in the examples above. The technical architecture 350 includes a processor 322 (which may be referred to as a central processor unit or CPU) that is in communication with memory devices including secondary storage 324 (such as disk drives), read only memory (ROM) 326, random access memory (RAM) 328. The processor 322 may be implemented as one or more CPU chips. The technical architecture 350 may further comprise input/output (I/O) devices 330, and network connectivity devices 332.

The secondary storage 324 is typically comprised of one or more disk drives or tape drives and is used for non-volatile storage of data and as an over-flow data storage device if RAM 328 is not large enough to hold all working data. Secondary storage 324 may be used to store programs which are loaded into RAM 328 when such programs are selected for execution. The ROM 326 is used to store instructions and perhaps data which are read during program execution. The secondary storage 324, the RAM 328, and/or the ROM 326 may be referred to in some contexts as computer readable storage media and/or non-transitory computer readable media.

The I/O devices may include capacitance meters, inductance meters, voltage meters, force sensors and so on for measuring the measurable output, first and second robots to hold and move the first and second objects respectively, printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network or might output information to the network in the course of performing the method operations described herein. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 350, at least one of the CPU 322, the RAM 328, and the ROM 326 are changed, transforming the technical architecture 350 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 350 is described with reference to a computer, it should be appreciated that the technical architecture 350 may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 350 to provide the functionality of a number of servers that is not directly bound to the number of computers in the technical architecture 350. In an example of an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

As mentioned above, the first and second electronic elements may be fabricated by additive manufacturing, for example using the HP® Jet Fusion printer, by modulating the conductivity property of individual voxels by selective addition of chemical agents via inkjet deposition during the Jet Fusion build process. Alternatively, the first and second electronic elements may comprise electronic components inserted during the Jet Fusion build process or other fabrication process of the first and second objects respectively.

By taking advantage of the capabilities of additive manufacturing systems that can fabricate differentiated voxels to fabricate the first object for assembly with the second object as described with reference to the examples of the embodiments given above, the following advantages can be obtained:

reduction of assembly errors, scrap, and rework allowing less expensive assembly capabilities (human and/or automated) to perform high quality operations parts can carry part-specific assembly "instructions" by way of appropriately tailored electronic elements added when each part is fabricated knowledge related to assembly is captured at part design and cannot be lost or separated from digital descriptions of the part Whilst there has been described in the foregoing description examples of embodiments of the present invention, it will be understood by those skilled in the technology concerned that many variations and combination in details of design, construction and/or operation may be made without departing from the present invention. For example, the term "adjacent" as used in this application can be understood to mean "very near but not touching", "next to", or "touching" with reference to the first electronic element being provided adjacent the first mating portion and the second electronic element being provided adjacent the second mating portion, depending on the configuration of each specific embodiment of the first object and the second object being implemented.

The invention claimed is:

1. A kit for assembling objects, the kit comprising:
a first object and a second object for assembly with each other to form an assembled body;
the first object comprising a first body having a first mating portion, a first electronic element fabricated on the first body, and first conductive traces provided exposed on at least one surface of the first body and in conductive contact with the first electronic element; and
the second object comprising a second body having a second mating portion, a second electronic element fabricated on the second body, and second conductive traces provided exposed on at least one surface of the second body and in conductive contact with the second electronic element;
wherein the first conductive traces and the second conductive traces are configured to electrically couple with an electronic circuit such that the first electronic element and the second electronic element establish an electrical coupling between each other,
and wherein the electrical coupling is configured to provide a measurable output for positioning the first mating portion at a desired position relative to the second mating portion according to an analysis of the measurable output against a predetermined reference output.

2. The kit of claim 1, wherein the first electronic element is provided exposed on a surface of the first body.

3. The kit of claim 1, wherein the first electronic element is provided embedded under a surface of the first body.

4. The kit of claim 1, wherein the electrical coupling comprises one of: conductive coupling, capacitive coupling, and inductive coupling.

5. The kit of claim 1, wherein the first electronic element is provided adjacent the first mating portion and the second electronic element is provided adjacent the second mating portion.

6. The kit of claim 5, wherein the analysis of the measurable output against a predetermined reference output is indicative of relative positioning of the first mating portion with the second mating portion to guide alignment of the first mating portion with the second mating portion during assembly of the first object and the second object with each other, and wherein the measurable output is equal to the predetermined reference output when the first mating portion is at the desired position relative to the second mating portion.

7. The kit of claim 1, wherein the first mating portion comprises a hole and the second object comprises a peg to be inserted into the hole.

8. The kit of claim 7, wherein the first electronic element comprises a capacitive element provided on the first body around the hole and the second electronic element comprises a conductive plate provided at an end of the peg that is to be inserted into the hole.

9. The kit of claim 1, wherein the first object comprises an electro-mechanical switch provided on the first body for application of a force on the electro-mechanical switch, the electro-mechanical switch configured to close only when at least a predetermined force is applied on the electro-mechanical switch, wherein application of the force automatically stops when the electro-mechanical switch is closed.

10. The kit of claim 9, wherein the first object comprises a peg and the second mating portion comprises a hole, wherein stopping the application of the force stops insertion of the peg into the hole.

11. A method of assembling objects, the method comprising:
(a) positioning a first object and a second object for assembly with each other, the first object comprising a first body having a first mating portion, a first electronic element fabricated on the first body, and first conductive traces provided exposed on at least one surface of the first body and in conductive contact with the first electronic element, the second object comprising a second body having a second mating portion, a second electronic element fabricated on the second body, and second conductive traces provided exposed on at least one surface of the second body and in conductive contact with the second electronic element;
(b) electrically coupling the first conductive traces and the second conductive traces with an electronic circuit;
(c) establishing an electrical coupling between the first electronic element and the second electronic element;
(d) obtaining a measurable output from the electrical coupling established between the first electronic element and the second electronic element; and
(e) analyzing the measurable output against a predetermined reference output while moving the first mating portion relative to the second mating portion to position the first mating portion at a desired position relative to the second mating portion.

12. The method of claim 11, wherein the first electronic element is additively manufactured adjacent the first mating portion and the second electronic element is additively manufactured adjacent the second mating portion, wherein analyzing the measurable output against a predetermined reference output while moving the first mating portion relative to the second mating portion is to guide alignment of the first mating portion with the second mating portion to position the first mating portion at the desired position relative to the second mating portion during assembly of the first object and the second object with each other, and wherein the measurable output is equal to the predetermined reference output when the first mating portion is at the desired position relative to the second mating portion.

13. The method of claim 11, wherein the first mating portion comprises a hole and the second object comprises a peg.

14. The method of claim 13, wherein the first electronic element comprises a capacitive element provided on the first body around the hole and the second electronic element comprises a conductive plate provided at an end of the peg that is to be inserted into the hole.

15. The method of claim 11, further comprising gripping and manipulating the first object with a gripper having the conductive portions of the electronic circuit provided thereon such that the conductive portions electrically couple with the first electronic element and the second electronic element.

16. The method of claim 11, wherein the first object comprises an electro-mechanical switch provided on the first body for application of a force on the electro-mechanical switch, the method further comprising applying the force at an increasing magnitude until a predetermined force is reached that closes the electro-mechanical switch to thereby automatically stop application of the force.

17. The method of claim 11, wherein the electrical coupling comprises one of: conductive coupling, capacitive coupling, and inductive coupling.

18. A computer readable medium carrying processor executable instructions which when executed on a processor cause the processor to carry out the method of claim 11.

* * * * *